United States Patent [19]

Katto et al.

[11] 4,447,578

[45] May 8, 1984

[54] THERMOPLASTIC RESIN COMPOSITION

[75] Inventors: Takayuki Katto; Yasumasa Komatsu; Zenya Shiiki, all of Iwaki, Japan

[73] Assignee: Kureha Kagaku Kogyo Kabushiki Kaisha, Tokyo, Japan

[21] Appl. No.: 451,325

[22] Filed: Dec. 20, 1982

[30] Foreign Application Priority Data

Dec. 21, 1981 [JP] Japan .................................. 56-206645

[51] Int. Cl.$^3$ .............................................. C08L 51/00
[52] U.S. Cl. ........................................ 525/75; 525/80; 525/84; 525/86; 526/284
[58] Field of Search ......................... 525/86, 75, 80, 84

[56] References Cited

U.S. PATENT DOCUMENTS 3,985,827 10/1976 Hicks ..................................... 525/86

Primary Examiner—J. Ziegler
Attorney, Agent, or Firm—Wenderoth, Lind & Ponack

[57] ABSTRACT

A thermoplastic resin composition having high heat resistance coupled with high impact resistance is obtained by combining a predominant amount of (A) a copolymer of methyl methacrylate, acrylonitrile, 2-isopropenylnaphthalene and α-methylstyrene, and (B) a graft copolymer of methyl methacrylate, optionally with styrene and acrylonitrile, on a butadiene rubber.

4 Claims, No Drawings

THERMOPLASTIC RESIN COMPOSITION

BACKGROUND OF THE INVENTION

The present invention relates to a novel thermoplastic resin composition having high heat resistance coupled with high impact resistance.

While acrylonitrile-styrene copolymer compositions comprising a rubber (hereinafter abbreviated to ABS resins) are widely used because of their excellent processability and high impact resistance, they are still accompanied by the disadvantageous problem of a low heat distortion temperature. In order to solve this problem, various resin compositions have been proposed, for example, as follows.

(1) A composition wherein styrene (St) which is a monomer to be grafted onto a rubber together with another monomer acrylonitrile (AN) is replaced by α-methylstyrene (α-Mest) (U.S. Pat. No. 2,908,661).

(2) A composition comprising a blend of an ABS resin and an α-Mest/AN copolymer (Japanese Patent Pub. No. 18194/1960).

(3) A composition obtained by grafting onto a rubber St and AN, and then α-Mest and AN (Japanese Patent Pub. No. 13616/1967).

(4) A composition comprising a blend of an ABS resin and an α-Mest/methyl methacrylate (MMA)/AN copolymer (Japanese Patent Pub. No. 18016/1970, No. 33304/1970 and No. 15902/1969).

(5) A composition comprising an α-Mest/MMA/AN copolymer and a graft copolymer obtained by graft-polymerizing MMA, St and AN onto a rubber (Japanese Patent Pub. No. 37415/1971).

The heat resistance of resins can thus be improved by the use of α-Mest and MMA in place of conventional resin constituents, but this measure is still inadequate, and there has been an urgent demand for ABS resins having higher heat resistance.

SUMMARY OF THE INVENTION

A principal object of the present invention is to provide a thermoplastic resin composition having high heat resistance that could not be obtained by conventional heat-resistant ABS resins or ultraheat-resistant ABS resins coupled with high impact resistance and improved processability.

We have found that a composition comprising a copolymer (A) of 2-isopropenylnaphthalene (2-IPN), α-Mest, MMA and AN, and a graft copolymer (B) as an impact resistance modifier obtained by graft-polymerizing onto a diene rubber MMA, or a monomer mixture of MMA and St or MMA, St and AN exhibits highly satisfactory heat resistance and impact resistance. On the basis of this finding, we have arrived at the present invention.

The thermoplastic resin composition according to the present invention comprises (A) 50 to 90% of a copolymer obtained by polymerizing a monomer mixture comprising 10 to 50% of MMA, 5 to 25% of AN, and 40 to 75% in total of 2-IPN and α-Mest, the quantity of the 2-IPN being 5 to 70% of the total quantity of the 2-IPN and the α-Mest, and (B) 10 to 50% of a graft copolymer obtained by polymerizing 15 to 50 parts of a grafting monomer component comprising 10 to 100% of methyl methacrylate, 0 to 70% of styrene, and 0 to 30% of acrylonitrile in the presence of 50 to 85 parts of a butadiene rubber, the total of the grafting monomer component and the butadiene rubber constituting 100 parts, all parts and percentages herein being by weight.

One of the distinguishing features of the resin composition of this invention is its high heat resistance. Owing to the copolymer of 2-IPN, α-Mest, MMA and AN used as a base resin, notably high heat resistance can be obtained in comparison with conventional copolymer compositions containing no 2-IPN, for example, those comprising as a base resin α-Mest, MMA and AN or α-Mest, ST and AN. Thus, the incorporation of 2-IPN into the resin composition is strikingly effective in imparting high heat resistance to the composition.

Another feature of the resin composition of this invention is its high impact resistance. While improved heat resistance can be obtained by the copolymer containing 2-IPN (copolymer (A)) alone, this type of copolymer has poor impact resistance and hence the practical utility thereof is limited. By blending the graft copolymer (B) obtained by polymerizing a monomer mixture comprising MMA, MMA and St, or MMA, St and AN as specified in the present invention in the presence of a butadiene rubber latex having a large average particle size with the above described copolymer as an impact resistance modifier, a resin composition possessing improved impact resistance can be obtained. Meanwhile, the degree of polymerization of the copolymer (A) can be controlled with a chain transfer agent and the melt viscosity of the resin composition can also be controlled easily.

The present invention will now be described in more detail. Throughout the description, "parts" and "percentages" are by weight unless otherwise specified.

DETAILED DESCRIPTION OF THE INVENTION

First, the copolymer (A) of 2-IPN, α-Mest, MMA and AN which is the principal constituent of the resin composition of the present invention will be described. This copolymer imparts to the resin composition heat resistance, hardness and tensile strength which vary with the composition of the constituent monomers to some extent.

2-IPN is an important component which contributes most to heat resistance among the four monomers constituting the copolymer (A). α-Mest also contributes to heat resistance. While the total quantity of the 2-IPN and the α-Mest is preferably as large as possible from the point of view of heat resistance, the use of an excess of these monomers results in a low copolymerization yield so that the sum of the quantities of these monomers should be 40 to 75%, preferably 45 to 70%, of the total quantity of the monomer mixture giving the copolymer (A). If this quantity is less than 40%, heat resistance of the composition cannot sufficiently be improved while, in the case where this quantity exceeds 75%, the copolymerization yield becomes lower.

The 2-IPN, in particular, contributes to heat resistance and imparts higher heat resistance than α-Mest alone. The 2-IPN is used in a quantity of 5 to 70%, preferably 10 to 60%, of the total quantity of the 2-IPN and the α-Mest. Less than 5% of 2-IPN cannot provide high heat resistance as in the present invention. Conversely, more than 70% of this monomer results in somewhat poor polymerizability. The heat resistance of the resin composition of the present invention improves when the 2-IPN and α-Mest are incorporated in the copolymer, and further the thermal decomposition resistance of the copolymer (A) can be increased by the presence of the 2-IPN as compared with the α-Mest used singly.

AN is effective in improving the impact resistance of the copolymer (A), and also in increasing the polymerizability of the monomer mixture when the copolymer (A) is prepared by emulsion polymerization. Since a great quantity of AN lowers the heat resistance of the resin composition, this monomer is used at levels between 5% and 25%.

MMA is added in a quantity of from 10 to 50% in order to balance the heat resistance, heat stability and polymerization rate.

Among various polymerization processes, emulsion polymerization is most preferably employed so that the 2-IPN and α-Mest which contribute to heat resistance can be used in the largest possible quantity and the polymerization rate and yield can be improved at the same time. The copolymer can be prepared by any known emulsion polymerization process using a peroxide, emulsifier, polymerization accelerator or the like. The monomer mixture to be polymerized may be added at one time, intermittently, or continuously. Chain transfer agents such as mercaptans can be used to control the molecular weight of the copolymer.

It is desirable that the polymerization yield of the copolymer (A) be 80% or higher, and the copolymer obtained has poor heat resistance when unreacted monomers remain therein. In the case where a considerable quantity of monomers remain unreacted, such residual monomers are preferably removed by a conventional method, for example, blowing of steam into the latex, extraction from the powdery polymer with a solvent, or removal at a high temperature under reduced pressure. As the solvent for extraction, alcohols such as methanol and ethanol, or aliphatic hydrocarbons such as hexane and heptane can be used.

The graft copolymer (B), which is another constituent of the resin composition of the present invention incorporated therein as an impact resistance modifier, is obtained by polymerizing 15 to 50 parts of a monomer mixture comprising 10 to 100% of MMA, 0 to 70% of St, and 0 to 30% of AN in the presence of 50 to 85 parts of a butadiene rubber. The butadiene rubber may contain a crosslinking agent and a chain transfer agent in small quantities, and a crosslinking agent or a chain transfer agent in trace amounts may further be added thereto when the rubber is subjected to graft polymerization.

The graft copolymer can be prepared by ordinary polymerization processes among which emulsion polymerization is, however, especially preferred. In order to obtain a resin composition with high impact resistance, it is preferable that a monomer mixture be added to and graft-polymerized onto a butadiene rubber in latex form having an average particle size of 1,500 to 8,000 Å. Such rubber latex can be obtained by conventional emulsion polymerization. The rubber latex having a large particle size can be prepared by a known process, for example, multi-stage seed polymerization or micro-agglomeration of rubber particles of a small size with an acid, salt or water-soluble high polymer. The micro-agglomeration is preferred because of its simplicity.

The micro-agglomeration is carried out in a known manner in the presence of an inorganic acid such as hydrochloric acid, or an organic acid such as tartaric acid, malic acid and acetic acid; a water-soluble high polymer such as polyethylene oxide and polyvinyl alcohol; or a metal salt such as sodium chloride and magnesium chloride, or a combination of a peroxide and formaldehyde sulfoxylate.

If the average particle size of the butadiene rubber used as a trunk polymer is smaller than 1,500 Å, the impact resistance imparting effect thereof will be poor. On the other hand, the use of a rubber having an average particle size larger than 8,000 Å is undesirable because the stability of the rubber latex becomes lower, giving rise to precipitation during graft-polymerization and reduction of the polymerization rate.

The butadiene rubber used in the present invention is a polybutadiene or a copolymer comprising as a principal constituent, preferably 60% or more butadiene and one or more vinyl monomers copolymerizable therewith.

For vinyl monomers copolymerizable with the butadiene, aromatic vinyl monomers, alkyl methacrylates and alkyl acrylates can be used.

Among the aromatic vinyl monomers, styrene is especially preferred, but α-methylstyrene and vinylnaphthalene, alkyl-substituted styrene such as 4-dimethylstyrene and vinyltoluene, or halo-substituted styrene such as p-bromostyrene and p-chlorostyrene can also be used.

Examples of suitable alkyl methacrylates are those having 1 to 4 carbon atoms in the alkyl group, methyl methacrylate, ethyl methacrylate, n-butyl methacrylate and isobutyl methacrylate being particularly suitable.

For alkyl acrylates, those having 1 to 8 carbon atoms in the alkyl group such as methyl acrylate, ethyl acrylate, butyl acrylate and 2-ethylhexyl acrylate are preferable.

In the process of the polymerization for production of the butadiene rubber, a small quantity of a crosslinking agent or a chain transfer agent may be used to control the properties of the rubber.

The crosslinking agents to be added for this purpose are selected from compounds copolymerizable with the butadiene and ethylenically unsaturated monomers, such as divinylbenzene, ethylene glycol dimethacrylate, diethylene glycol dimethacrylate, triethylene glycol dimethacrylate, tetraethylene glycol dimethacrylate, ethylene glycol diacrylate, diethylene glycol diacrylate, triethylene glycol diacrylate, trimethylolpropane trimethacrylate and triacrylate, and 1,3-butylene dimethacrylate.

Examples of chain transfer agents are known ones such as n-octylmercaptan, n-dodecylmercaptan, and tert-dodecylmercaptan.

For the grafting monomer component, a monomer mixture comprising 10 to 100% of MMA, 0 to 70% of styrene, and 0 to 30% of acrylonitrile is used to obtain an increased impact resistance imparting effect. For instance, MMA alone, or a mixture of MMA and St or MMA, St and AN is preferably employed.

In order to obtain a high impact resistance imparting effect and also to facilitate post-treatments such as salting out or acid precipitation, and drying, the ratio of the grafting component to the rubber component must be 15 to 50 parts to 50 to 85 parts, the total of the grafting component and the rubber component constituting 100 parts. In the graft polymerization, the above monomer mixture may be polymerized either in a single stage or in several stages in divided lots. Crosslinking agents and chain transfer agents similar to those used in the production of the butadiene rubber can be used in the polymerization of the grafting component.

The heat resistance and impact resistance of the resin composition of the present invention are materially affected by the compositions of the copolymer (A) and the graft copolymer (B) and also by the blending ratio therebetween. Relative to 50 to 90% of the copolymer (A), 10 to 50% of the graft copolymer (B) is used to maintain an adequate balance between these properties.

Blending can be carried out by a conventional method. For example, the respective polymers in the form of powder or pellets are blended with each other with a roll, screw, kneader or Banbury mixer. A method which involves blending the copolymer latex with the graft copolymer latex, and then subjecting the polymer blend to salting out or acid precipitation can also be utilized.

If desired, antioxidants, stabilizers, fillers, pigments, plasticizers and like additives may be added during the blending.

The resin composition of this invention possesses high heat resistance and impact resistance coupled with improved mechanical properties and processability and is useful as a material for injection molding or extrusion molding.

In order to indicate more fully the nature and utility of this invention, the following specific examples of practice constituting preferred embodiments of the invention and comparison examples are set forth, it being understood that these examples are presented as illustrative only and not intended to limit the scope of the invention.

In the examples, the solution viscosity ($\eta sp/c$) was measured in a benzene solvent at a concentration of 4 g/l at a temperature of 30° C., and the glass transition temperature (Tg) was determined by means of a DSC (differential scanning calorimeter supplied by Rigaku Denki K.K., Japan) in an atmosphere of $N_2$ at a temperature rising rate of 10° C./min.

EXAMPLES 1 THROUGH 7 AND COMPARISON EXAMPLE 1

Copolymer (A)

Into a polymerization vessel were charged 250 parts of water, 0.0025 part of $FeSo_4.7H_2O$, 0.01 part of sodium ethylenediaminetetraacetate (hereinafter abbreviated to Na salt of EDTA), 0.4 part of Rongalit, 3 parts of potassium oleate (OLK), and 100 parts of a monomer mixture of various compositions as shown in Table 1 together with trace amounts of tert-dodecyl mercaptan (t-DM) and 0.3 part of cumene hydroperoxide (CHP). The mixture was subjected to polymerization at 60° C. for 15 hours. The latex obtained was precipitated with dilute hydrochloric acid, and then dried. After drying, residual monomers were removed by extraction with methanol. The composition, yield, $\eta sp/c$ and Tg of the copolymer (A) obtained are summarized in Table 1.

Subsequently, the heat stability (weight loss due to heat) of copolymers A-6, A-7 and A-8 were measured by means of a thermobalance supplied by Rigaku Denki K.K., Japan, at a temperature rising rate of 10° C./min. while $N_2$ was fed at a rate of 60 cc/min. The results obtained are set forth in Table 2.

TABLE 2

| | Temp. at which weight loss due to heat started (°C.) | Weight loss at 300° C. (%) | 50% weight loss temperature (°C.) |
|---|---|---|---|
| A-6 | 250 | 6 | 351 |
| A-7 | 256 | 6 | 353 |
| A-8 | 220 | 13 | 342 |

It is apparent that the copolymer A-8 which does not contain 2-IPN has lower heat stability than A-6 and A-7 which contain 2-IPN.

Graft Copolymer (B)

Into a polymerization vessel were charged 150 parts of water, 0.00195 part of $FeSO_4.7H_2O$, 0.00325 part of Na salt of EDTA, 0.1085 part of sodium pyrophosphate, 0.0234 part of Rongalit, 0.21 part of OLK, 15 parts of St, 50 parts of butadiene (Bu), 0.65 part of divinylbenzene (DVB), and 0.117 part of diisopropylbenzene hydroperoxide (HPO). The mixture was subjected to polymerization at 50° C. for 5 hours. To the latex thus obtained were added 0.54 part of OLK and 0.0058 part of Rongalit, and polymerization was conducted at 60° C. for 10 hours. The particle size of the rubber latex was 1,050 Å as measured in accordance with the turbidimetric method.

To 232 parts of this rubber latex (containing 65 parts of rubber) was added 6.5 parts of a 1% aqueous solution of dioctyl sodium sulfosuccinate, and 70 parts of a 3% aqueous solution of malic acid and 65 parts of a 2% aqueous solution of NaOH were further added slowly at the same time while the pH of the latex was adjusted to 7.4 at 60° C. Upon completion of the addition of these aqueous solutions, the pH of the latex was readjusted to 9.5, and 0.5 part of OLK was then added to the resulting latex. The average particle size of the rubber latex thus micro-agglomerated was 4,660 Å as measured by the turbidimetric method.

To the microscopically coagulated rubber latex were added 10.5 parts of MMA, 7 parts of St, 0.0875 part of t-DM, 0.035 part of HPO, and 0.0175 part of Rongalit, and polymerization was conducted at 60° C. for 5 hours. To the resulting latex was further added 10.5 parts of MMA, 7 parts of St, 0.0875 part of t-DM, 0.035 part of HPO, and 0.0175 part of Rongalit, and polymerization was continued at 60° C. for 7 hours.

To the latex thus obtained was added a small quantity of a phenolic antioxidant, and the latex was precipitated with hydrochloric acid and dried. As a result, an MMA-

TABLE 1

| Copolymer (A) | Composition of Monomer Mixture | | | | | Yield (%) | $\eta_{sp/c}$ (dl/g) | Tg (°C.) |
|---|---|---|---|---|---|---|---|---|
| | α-Mest | 2-IPN | MMA | AN | t-DM | | | |
| A-1 | 45 | 15(25)* | 25 | 15 | 0.1 | 88.6 | 0.33 | 145 |
| A-2 | 50 | 15(23.1) | 20 | 15 | 0.1 | 86.9 | 0.32 | 147 |
| A-3 | 55 | 10(15.4) | 20 | 15 | 0.1 | 87.7 | 0.34 | 144 |
| A-4 | 40 | 15(27.3) | 35 | 10 | 0.1 | 78.4 | 0.43 | 147 |
| A-5 | 30 | 15(33.3) | 45 | 10 | 0.1 | 80.5 | 0.45 | 144 |
| A-6 | 55 | 10(15.4) | 25 | 10 | 0.15 | 82.7 | 0.41 | 149.5 |
| A-7 | 45 | 20(31) | 25 | 10 | 0.1 | 80.1 | 0.40 | 153 |
| A-8 | 62 | 0(0) | 25 | 10 | 0.3 | 84.5 | 0.42 | 142 |

*The value in ( ) indicates % 2-IPN in the total quantity of α-Mest and 2-IPN.

St-Bu (MBS) graft copolymer B-1 was obtained in a yield of 98.5%.

61.5 parts each of the copolymers A-1 through A-8 obtained in the manner described above and 38.5 parts of the MBS graft copolymer B-1 were kneaded with rolls at 200° C. for 3 min. and press-formed at 220° C.

The Izod impact strength (as measured in accordance with ASTM-256 using a polymer sheet of 6 mm thickness with a V-notch of R=0.25 mm, Vicat softening point (as measured in accordance with ASTM D-1525 with a load of 1 kg), and Rockwell hardness (as measured in accordance with ASTM D-785 on R scale) of each of the polymer sheets thus prepared are shown in Table 3.

Meanwhile, in the case where the copolymer (A) alone was kneaded with rolls and press-formed, cracking occurred because of its brittleness and satisfactory polymer sheet specimens could not be obtained.

TABLE 3

| | Copolymer (A) | Graft copolymer (B) | Izod impact strength 2.3° C. | Izod impact strength 0° C. | Vicat softening point (°C.) | Rockwell hardness (R-scale) |
|---|---|---|---|---|---|---|
| Example 1 | A-1 | B-1 | 4.3 | 3.3 | 142 | 99 |
| Example 2 | A-2 | " | 5.5 | 4.3 | 143 | 98 |
| Example 3 | A-3 | " | 6.2 | 4.8 | 141 | 98 |
| Example 4 | A-4 | " | 6.4 | 5.6 | 143 | 101 |
| Example 5 | A-5 | " | 5.8 | 4.8 | 141 | 100 |
| Example 6 | A-6 | " | 7.4 | 6.0 | 144 | 99 |
| Example 7 | A-7 | " | 4.8 | — | 147.5 | 98 |
| Comparison Example 1 | A-8 | " | 8.0 | — | 138 | 95 |

As is apparent from Table 3, the composition of this invention has both high heat resistance and high impact resistance while the composition comprising copolymer A-8 which does not contain 2-IPN exhibits improved impact resistance but only poor heat resistance.

EXAMPLES 8 THROUGH 11 AND COMPARISON EXAMPLE 2

Copolymer (A)

Into a polymerization vessel were charged 250 parts of water, 0.0025 part of $FeSO_4.7H_2O$, 0.01 part of Na salt of EDTA, 0.4 part of Rongalit, and 5 parts of OLK, and the temperature within the vessel was raised to 60° C. To this mixture were added 100 parts each of monomer mixtures comprising α-Mest, 2-IPN, MMA and AN in the proportions set forth in Table 3, a small quantity of t-DM, and 0.3 part of CHP at a given rate with stirring over a period of 6 hours. Upon completion of this addition, 0.2 part of Rongalit was further added and polymerization was carried out for 2 hours.

Each of the copolymers thus obtained was subjected to post-treatments including extraction with methanol similar to those of the copolymer (A) of Example 1.

The composition of the monomer mixture, yield and $\eta sp/c$ of each copolymer (A) are shown in Table 4.

TABLE 4

| | Composition of Monomer Mixture | | | | Yield (%) | $\eta_{sp/c}$ (dl/g) |
|---|---|---|---|---|---|---|
| | α-Mest | 2-IPN | MMA | AN | t-DM | | |
| A-9 | 65 | 0(0)* | 25 | 10 | 0.3 | 85 | 0.37 |
| A-10 | 55 | 10(15.4) | 25 | 10 | 0.15 | 83 | 0.37 |
| A-11 | 45 | 20(30.8) | 25 | 10 | 0 | 81 | 0.36 |

*The figures in the parentheses indicate 2-IPN/(2-IPN + α-Mest)%.

Graft Copolymer (B)

Into a polymerization vessel were charged 200 parts of water, 0.00195 part of $FeSO_4.7H_2O$, 0.00325 part of Na salt of EDTA, 0.1085 part of sodium pyrophosphate, 0.02925 part of Rongalit, 0.3 part of OLK, 50 parts of Bu, 15 parts of St, 0.4875 part of DVB, and 0.117 part of HPO. The mixture was subjected to polymerization at 50° C. for 5 hours, whereupon 0.6 part of OLK was added, and polymerization was continued at 60° C. for 10 hours.

The particle size of the rubber latex was 950 Å as measured by the turbidimetric method, and the pH of the latex was 9.2.

The temperature of this rubber latex was raised to 60° C., and a solution comprising 0.46 part of Rongalit dissolved in 5.5 parts of water was added to the resulting latex with stirring. To the latex was further added 1.2 parts of 35% $H_2O_2$, and thereafter the stirring was stopped. The pH of the latex gradually decreased, but was readjusted to 10.8 with an aqueous NaOH solution 35 minutes after the addition of $H_2O_2$. The microagglomerated rubber latex thus obtained was found to have a particle size of 4,500 Å.

To this micro-agglomerated latex containing 65 parts of rubber were added 0.1 part of dioctyl sodium sulfosuccinate, 0.4 part of OLK and 100 parts of $H_2O$, and then 10.5 parts of MMA, 7 parts of St, 0.0875 part of t-DM, 0.0175 part of Rongalit, and 0.07 part of HPO were added. The resulting mixture was subjected to polymerization at 60° C. for 8 hours. The pH of the latex obtained was 7.6. After readjustment of the pH of this latex to 10.81, 10.5 parts of MMA, 7 parts of St, 0.0875 part of t-DM, 0.0175 part of Rongalit, and 0.07 part of HPO were added, and polymerization was continued at 60° C. for 10 hours.

The polymer obtained was subjected to post-treatments similar to those of the copolymer (B) of Example 1, whereupon an MBS graft copolymer B-2 having a rubber component: grafting component ratio of 65:35, the MMA:St ratio in the grafting component being 60:40, was obtained in a yield of 98.8%.

Further, 14 parts of MMA and 3.5 parts of St were added and polymerized twice and successively in the presence of a micro-agglomerated rubber latex prepared from the same recipe as that for the copolymer B-2 to obtain a graft copolymer B-3 having a rubber component:grafting component ratio of 65:35, the MMA:St ratio in the grafting component being 85:15, in a yield of 99%.

Similarly, 17.5 parts of MMa was added and polymerized twice in the presence of the micro-agglomerated rubber latex to obtain a graft copolymer B-4 having a rubber component:grafting component ratio of 65:35, the grafting component comprising MMA alone, in a yield of 99.2%.

61.5 parts each of the copolymers (A) was blended with 38.5 parts each of the graft copolymers (B) to obtain compositions listed in Table 5 (Examples 8 through 11 and Comparison Example 2). Each of the compositions was kneaded with rolls at 200° C. for 3 min. and press-formed at 220° C.

The Izod impact strength, Vicat softening point and melt viscosity of the respective polymer sheets thus prepared are summarized in Table 5.

TABLE 5

|  | Copolymer (A) | Graft copolymer (B) | Izod impact strength (Kg · cm/cm) V-notch 23° C. | Vicat softening point (°C.) | Melt* viscosity (poise) |
|---|---|---|---|---|---|
| Example 8 | A-10 | B-2 | 7.9 | 144 | $4.5 \times 10^3$ |
| Example 9 | A-11 | B-2 | 6.3 | 148 | $5.6 \times 10^3$ |
| Example 10 | A-10 | B-3 | 8.4 | 143.5 | — |
| Example 11 | A-10 | B-4 | 7.5 | 144 | $6.0 \times 10^3$ |
| Comparison Example 2 | A-9 | B-2 | 10.2 | 138 | $4.0 \times 10^3$ |

*Measured by a Kōka-type flow tester with a nozzle of a size of 1 mmφ × 10 mm and a load of 100 kg at 260° C. after 5 min. preheating.

It will be noted from Table 5 that the composition comprising a copolymer A-9 obtained by the continuous charge process and containing no 2-IPN has poor heat resistance.

EXAMPLES 12 THROUGH 20

Copolymer (A)

Copolymer A-6 which was used in Example 6 was utilized.

Graft Copolymer (B)

Graft copolymers B-5 through B-9, each being different in composition from the graft copolymer B-2, were prepared by substantially the same procedure as that for the graft copolymer B-2.

The compositions, the particle size of the rubber latex and other data of these graft copolymers are shown in Table 6.

The copolymers (A) and the graft copolymers (B) were blended in the ratios set forth in Table 7, and the polymer blends obtained were formed into sheets under the same conditions as in Example 8. The properties of each of the polymer sheets thus prepared were as shown in Table 7.

TABLE 7

|  | Copolymer (A) | Graft Copolymer (B) | (A)/(B) ratio | Izod impact strength, Kg · cm/cm, V-notch 23° C. | Izod impact strength, Kg · cm/cm, V-notch 0° C. | Vicat softening point (°C.) | Melt viscosity poise |
|---|---|---|---|---|---|---|---|
| Example 12 | A-6 | B-5 | 61.5/38.5 | 13.6 | — | 143 | $5.2 \times 10^3$ |
| Example 13 | A-6 | B-5 | 69/31 | 10.5 | 7.8 | 144 | $4.5 \times 10^3$ |
| Example 14 | A-6 | B-5 | 77/23 | 7.2 | 4.8 | 145 | $3.9 \times 10^3$ |
| Example 15 | A-6 | B-6 | 61.5/38.5 | 15.7 | 14.0 | 143 | $4.3 \times 10^3$ |
| Example 16 | A-6 | B-6 | 69/31 | 11.5 | 8.9 | 144 | $3.9 \times 10^3$ |
| Example 17 | A-6 | B-6 | 77/23 | 8.0 | 5.2 | 145 | $3.2 \times 10^3$ |
| Example 18 | A-6 | B-7 | 61.5/38.5 | 8.3 | — | 144 | $6.0 \times 10^3$ |
| Example 19 | A-6 | B-8 | 54.5/45.5 | 8.4 | — | 142.5 | $4.8 \times 10^3$ |
| Example 20 | A-6 | B-9 | 66.7/33.3 | 7.3 | — | 144 | $7.4 \times 10^3$ |

TABLE 6

| Graft co-polymer | Composition of rubber trunk polymer | | | | Latex particle size after micro-agglomeration, A | Composition of grafting component | | | | | | Rubber/ graft ratio |
|---|---|---|---|---|---|---|---|---|---|---|---|---|
|  | Bu | St | DVB | t-DM |  | MMA | St | t-DM | MMA | St | t-DM |  |
| B-5 | 50 | 15 | 0 | 0 | 4900 | 12.25 | 5.25 | 0.0875 | 12.25 | 5.25 | 0.0875 | 65/15 |
| B-6 | 50 | 15 | 0 | 0.3 | 5100 | " | " | " | " | " | " | " |
| B-7 | 50 | 15 | 0.4875 | 0 | 5600 | " | " | " | " | " | " | " |
| B-8 | 42.3 | 12.7 | 0.4125 | 0 | — | 15.75 | 6.75 | 0.1125 | 15.75 | 6.75 | 0.1125 | 55/45 |
| B-9 | 57.7 | 17.3 | 0.562 | 0 | — | 8.75 | 3.75 | 0.0625 | 8.75 | 3.75 | 0.0625 | 75/25 |

EXAMPLE 21

To the latex obtained in the graft copolymer B-2 and containing 65 parts of a micro-agglomerated rubber (average particle size: 4,500 Å) were added 0.1 part of dioctyl sodium sulfosuccinate, 0.4 part of OLK, and 100 parts of $H_2O$, and 10.5 parts of MMA, 5.25 parts of St, 1.75 parts of AN, 0.0875 part of t-DM, 0.0175 part of Rongalit, and 0.07 part of HPO were further added. The mixture was subjected to polymerization at 60° C. for 8 hours. After adjustment of the pH of the latex obtained to 10.8, 10.5 parts of MMA, 5.25 parts of St, 1.75 parts of AN, and 0.0875 part of t-DM were added, and polymerization was resumed at 60° C. for 10 hours. As a result, a graft copolymer having a rubber component: grafting component ratio of 65:35, the MMA:-

St:AN ratio in the grafting component being 60:30:10, was obtained in a yield of 98.5%.

38.5 parts of this graft copolymer and 61.5 parts of copolymer A-10 (α-Mest:2-IPN:MMA:AN:t-DM=55:10:25:10:0.15) were kneaded with rolls at 200° C. for 3 min. and press-formed at 220° C. The polymer sheet thus formed was found to have an Izod impact strength of 9.0 Kg.cm/cm and a Vicat softening point of 143.5° C.

We claim:

1. A thermoplastic resin composition having high heat resistance, high impact resistance and a Vicat softening point of 140° C. or higher, said composition comprising:
    (A) 50 to 90% of a copolymer obtained by polymerizing a monomer mixture comprising 10 to 50% of methyl methacrylate, 5 to 25% of acrylonitrile, and 40 to 75% in total of 2-isopropenylnaphthalene and α-methylstyrene, the quantity of the 2-isopropenylnaphthalene being 5 to 70% of the total quantity of the 2-isopropenylnaphthalene and the α-methylstyrene and wherein the polymerization yield of the thus-produced copolymer is 80% or higher; and,
    (B) 10 to 50% of a graft copolymer obtained by polymerizing 15 to 50 parts of a grafting monomer component comprising 10 to 100% of methyl methacrylate, 0 to 70% of styrene, and 0 to 30% of acrylonitrile in the presence of 50 to 85 parts of a butadiene rubber in latex form having a particle size of 1500–8000 Å; the total of the grafting monomer component and the butadiene rubber constituting 100 parts, all parts and percentages herein being by weight.

2. A thermoplastic resin composition as claimed in claim 1, wherein the copolymer (A) has been obtained by emulsion polymerization.

3. A thermoplastic resin composition as claimed in claim 1, wherein the copolymer (B) has been obtained by emulsion polymerization.

4. A thermoplastic resin composition as claimed in claim 1, wherein the total quantity of the 2-isopropenylnaphthalene and the α-methylstyrene in the monomer mixture which produces the copolymer (A) is 45 to 70%, and the 2-isopropenylnaphthalene constitutes 10 to 60% of the total quantity of these monomers.

* * * * *